US012663266B2

(12) United States Patent
Miranda et al.

(10) Patent No.: US 12,663,266 B2
(45) Date of Patent: Jun. 23, 2026

(54) PHASE MODULATION SIGNAL GENERATING DEVICE FOR FIBER-OPTIC GYROSCOPE

(71) Applicant: INSTITUTE OF SCIENCE TOKYO, Tokyo (JP)

(72) Inventors: Martin Santiago Miranda, Tokyo (JP); Nobuyuki Takei, Tokyo (JP); Yuki Miyazawa, Tokyo (JP); Mikio Kozuma, Tokyo (JP)

(73) Assignee: INSTITUTE OF SCIENCE TOKYO, Tokyo (JP)

( * ) Notice: Subject to any disclaimer, the term of this patent is extended or adjusted under 35 U.S.C. 154(b) by 0 days.

(21) Appl. No.: 19/118,354

(22) PCT Filed: Oct. 7, 2022

(86) PCT No.: PCT/JP2022/037744
§ 371 (c)(1),
(2) Date: Apr. 3, 2025

(87) PCT Pub. No.: WO2024/075308
PCT Pub. Date: Apr. 11, 2024

(65) Prior Publication Data
US 2026/0009644 A1 Jan. 8, 2026

(51) Int. Cl.
*G01C 19/72* (2006.01)
*G01C 19/5776* (2012.01)
(Continued)

(52) U.S. Cl.
CPC ....... *G01C 19/721* (2013.01); *G01C 19/5776* (2013.01); *G01C 19/64* (2013.01); *G01C 19/72* (2013.01); *H01S 3/10053* (2013.01)

(58) Field of Classification Search
CPC .. G01C 19/721; G01C 19/5776; G01C 19/64; G01C 19/72; H01S 3/10053
See application file for complete search history.

(56) References Cited

U.S. PATENT DOCUMENTS 5,459,575 A * 10/1995 Malvern ................ G01C 19/72
356/463
6,563,589 B1 * 5/2003 Bennett ................ G01R 15/246
356/483
(Continued)

FOREIGN PATENT DOCUMENTS

JP 2019-522218 A 8/2019
JP 2019-184599 A 10/2019
WO 2021/124790 A1 6/2021

OTHER PUBLICATIONS

"Multi-Harmonic Modulation in a Fiber-Optic Gyroscope" by Miranda et al., Sensors 2023, 23, 4442, p. 1-12, May 1, 2023 (Year: 2023).*
(Continued)

*Primary Examiner* — Jonathan M Hansen
(74) *Attorney, Agent, or Firm* — Spencer Fane LLP

(57) ABSTRACT

A phase modulation signal generating device for a fiber-optic gyroscope includes a sine wave generating part and a superimposing part. The sine wave generating part generates a fundamental sine wave of an odd-order frequency ($v=(2n+1)v_e$, where $n=0, 1, 2, \ldots$) of the eigenfrequency ($v_e$) of the fiber-optic coil and a higher-order sine wave of an odd-order harmonic frequency (($2m+1$) v, where $m=1, 2, 3, \ldots$) of the odd-order frequency (v). The superimposing part superimposes the fundamental sine wave and higher-order sine wave generated by the sine wave generating part at a ratio using a modulation index optimized according to a noise target to be minimized and outputs the resultant signal as a phase modulation signal.

10 Claims, 2 Drawing Sheets

(51) Int. Cl.
  *G01C 19/64* (2006.01)
  *H01S 3/10* (2006.01)

(56) References Cited

U.S. PATENT DOCUMENTS

| | | | |
|---|---|---|---|
| 6,765,678 B2 * | 7/2004 | Strandjord | G01C 19/721 |
| | | | 356/460 |
| 10,337,867 B1 | 7/2019 | Dimashkie et al. | |
| 2003/0128365 A1 * | 7/2003 | Strandjord | G01C 19/721 |
| | | | 356/460 |
| 2019/0331492 A1 | 10/2019 | Ducloux | |
| 2023/0030335 A1 | 2/2023 | Kozuma | |

OTHER PUBLICATIONS

International Search Report in the corresponding International Patent Application No. PCT/JP2022/037744, dated Dec. 27, 2022.

* cited by examiner

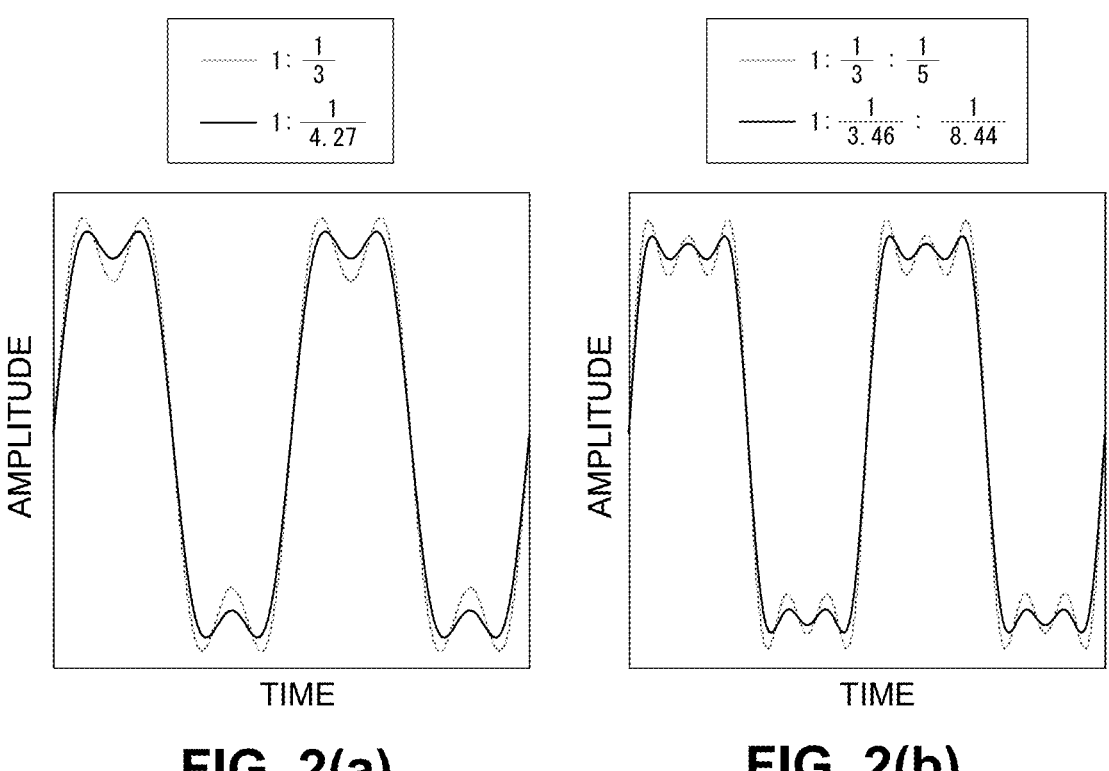
FIG. 2(a)                                    FIG. 2(b)
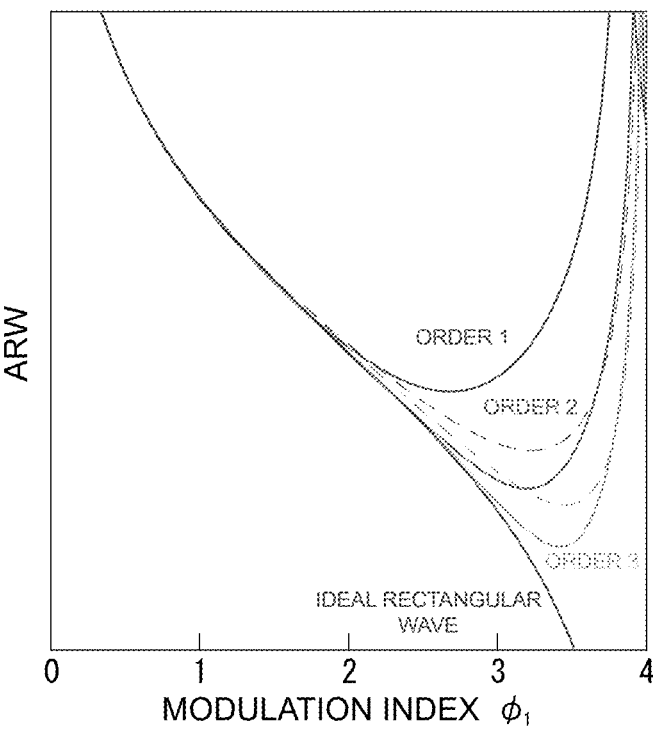
FIG. 3

PHASE MODULATION SIGNAL GENERATING DEVICE FOR FIBER-OPTIC GYROSCOPE

This application is a U.S. national stage application of International Application No. PCT/JP2022/037744, filed on Oct. 7, 2022.

BACKGROUND

Technical Field

The present invention relates to a phase modulation signal generating device for a fiber-optic gyroscope, and more particularly to a phase modulation signal generating device for a fiber-optic gyroscope that generates a phase modulation signal to a multi-function integrated optical circuit of an interference type fiber-optic gyroscope using a fiber-optic coil.

Background Information

Along with recent rapid development of automatic control and autonomous navigation technologies, a demand for improving in accuracy of the current position of a moving body has been increasing year by year. As the autonomous navigation technology, a GNSS (Global Navigation Satellite System) and an INS (Inertial Navigation System) are known.

As a sensor for use in the INS, a fiber-optic gyroscope (FOG) is known (see, for example, Japanese Laid-Open Patent Application No. 2019-184599, which is hereinafter referred to as Patent Document 1). The fiber-optic gyroscope is a rotation angular velocity sensor utilizing the Sagnac effect of light. The fiber-optic gyroscope uses a fiber-optic coil and has advantages of having no moving part, being smaller in size than conventional mechanical gyros, and being maintenance free and thus has attracted attention.

The fiber-optic gyroscopes are required to increase the stability of a scale factor, which corresponds to the ratio between angular velocity and an output signal, in order to improve the Allan deviation serving as an index of its accuracy. Patent Document 1 is known as a technology for increasing the stability of such a scale factor. Patent Document 1 relates to a symmetric wavelength multiplexer that provides a stabilized light source that reduces scale factor error by reducing the asymmetry of a spectrum between the orthogonal axes of wavelength. A stabilized light source like the one disclosed in Patent Document 1 provides a good scale factor; however, when used as a light source for a fiber-optic gyroscope, its narrow laser bandwidth brings about performance degradation due to light backscattering or polarization coupling within the fiber-optic coil.

To avoid such problems as light backscattering and polarization coupling within the fiber-optic coil, a broadband laser beam may be used. International Application Publication No. WO 2021/124790, which is hereinafter referred to as Patent Document 2, by the same applicant as that of the present application is known as a light source device for a fiber-optic gyroscope that broadens the bandwidth of a laser beam while improving the scale factor stability of the laser beam.

Here, broadening the bandwidth of the laser light from the light source device for a fiber-optic gyroscope may cause temporal fluctuation in light intensity due to mutual interference between lights of different frequencies. This intensity fluctuation is referred to as intensity noise, and intensity noise per unit frequency divided by an average light power is referred to as relative intensity noise (RIN). In Patent Document 2, RIN is reduced by performing phase modulation, at odd multiples of the eigenfrequency of the fiber-optic coil, for a multi-function integrated optical circuit used not in a light source device side for a fiber-optic gyroscope but in an interference type fiber-optic gyroscope side.

SUMMARY

As described above, in Patent Document 2, the light source device for a fiber-optic gyroscope achieves bandwidth broadening while improving the scale factor stability, and phase modulation is performed for the multi-function integrated optical circuit used in the interference type fiber-optic gyroscope at odd multiples of the eigenfrequency of the fiber-optic coil, whereby RIN is reduced. However, the development of a technology for further reducing RIN has been required. Furthermore, there is required a fiber-optic gyroscope capable of reducing not only RIN but also various types of noise such as shot noise.

The present invention has been made in view of the above situation, and an object thereof is to provide a phase modulation signal generating device for a fiber-optic gyroscope capable of generating a phase modulation signal to a multi-function integrated optical circuit suitable for reducing various types of noise including relative intensity noise and shot noise.

To achieve the above object of the present invention, a phase modulation signal generating device for a fiber-optic gyroscope according to the present invention includes: a sine wave generating part that generates a fundamental sine wave of an odd-order frequency ($v=(2n+1)v_e$, where n=0, 1, 2, . . . ) of the eigenfrequency ($v_e$) of the fiber-optic coil and a higher-order sine wave of an odd-order harmonic frequency ($(2m+1)$ v, where m=1, 2, 3, . . . ) of the odd-order frequency (v); and a superimposing part that superimposes the fundamental sine wave and higher-order sine wave generated by the sine wave generating part at a ratio using a modulation index optimized according to a noise target to be minimized and outputs the resultant signal as a phase modulation signal.

The odd-order harmonic frequency of the higher-order sine wave generated by the sine wave generating part may be 3 v.

The odd-order harmonic frequencies of the higher-order sine wave generated by the sine wave generating part may be 3 v and 5 v.

The fundamental sine wave generated by the sine wave generating part may be used as a reference signal for demodulation.

A superimposed signal output from the superimposing part may be used as a reference signal for demodulation.

A noise target to be minimized in the superimposed part may be relative intensity noise.

The phase modulation signal generating device for a fiber-optic gyroscope according to the present invention has an advantage that it can generate a phase modulation signal to a multi-function integrated optical circuit suitable for reducing various types of noise including relative intensity noise and shot noise.

BRIEF DESCRIPTION OF THE DRAWINGS

Referring now to the attached drawings which form a part of this original disclosure, illustrative embodiments are shown.

FIGS. 2(a) and 2(b) illustrate the waveforms of a phase modulation signal generated by the phase modulation signal generating device for a fiber-optic gyroscope according to the present invention.

FIG. 3 is a graph illustrating a change in ARW (Angular Random Walk) with respect to the modulation index.

DETAILED DESCRIPTION OF EMBODIMENTS

Figure 1:
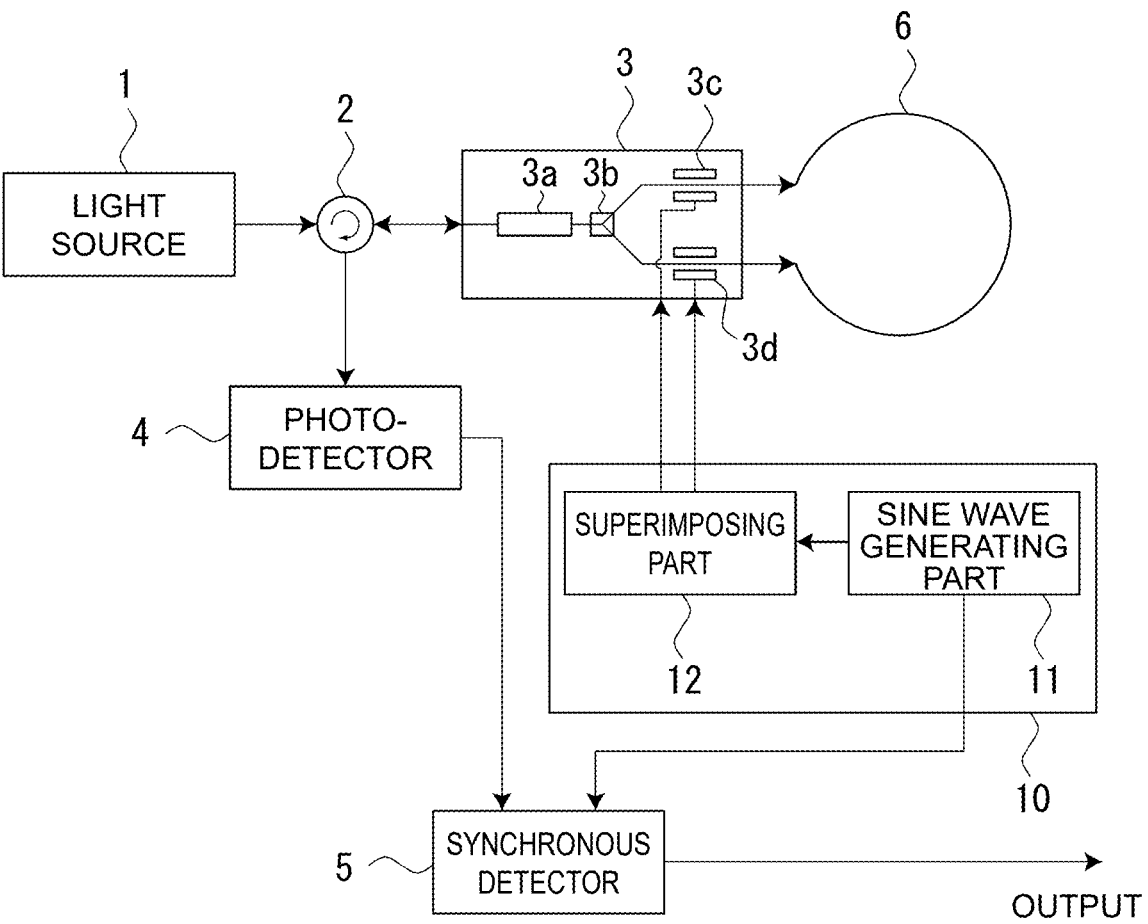
FIG. 1 is a schematic block diagram for explaining the entire configuration of an example of an interference type fiber-optic gyroscope that uses a phase modulation signal generating device for a fiber-optic gyroscope according to the present invention.

Hereinafter, an embodiment for practicing the present invention will be described with illustrated examples. A phase modulation signal generating device for a fiber-optic gyroscope according to the present invention is a device capable of generating a phase modulation signal to a multi-function integrated optical circuit of an interference type fiber-optic gyroscope using a fiber-optic coil. The interference type fiber-optic gyroscope is not particularly limited to a specific one and may be any existing or future-developed interference type fiber-optic gyroscope.

FIG. 1 is a schematic block diagram for explaining the entire configuration of an example of an interference type fiber-optic gyroscope that uses the phase modulation signal generating device for a fiber-optic gyroscope according to the present invention. The interference type fiber-optic gyroscope mainly includes a light source 1, an optical circulator 2, a multi-function integrated optical circuit 3, a phase modulation signal generating device 10 for a fiber-optic gyroscope according to the present invention, a photodetector 4, and a synchronous detector 5. The multi-function integrated optical circuit 3 is connected with a fiber-optic coil 6. The fiber-optic coil 6 is a coil of fiber having a length of, for example, 1 km.

The light source 1 emits laser light of a predetermined frequency. The laser light from the light source 1 only needs to be a continuous wave (CW) light. Examples of the light source 1 may include a semiconductor laser, a solid-state laser, a gas laser, and a dye laser. Specifically, as the light source 1, an SLD (Super Luminescent Diode) light source can be used, for example. The wavelength of the laser light emitted from the light source 1 is not limited to a specific one. One example of the wavelength is 1.5 micrometer at which the propagation loss of the fiber-optic coil 6 is low. The laser light source of the light source 1 is not limited to a continuous laser light source. It may be, for example, a pulse laser light source that emits light of pulse-like spectra arranged at a predetermined regular interval. Specifically, it may be, for example, an optical comb light source. The light source 1 may be any existing or future-developed light source.

The optical circulator 2 separates light from the light source 1 and interference light obtained by recombining counterclockwise light and clockwise light that have passed through the fiber-optic coil 6. That is, the optical circulator 2 outputs the light from the light source 1 to the multi-function integrated optical circuit 3 to be described later and outputs the interference light returned thereto to the photodetector 4 to be described later. On the drawing, the light from the light source 1 enters the optical circulator 2 from the left side thereof, and this light is output from the right side of the optical circulator 2. Then, the returned interference light obtained by recombining the counterclockwise light and the clockwise light that have passed through the fiber-optic coil 6 enters the optical circulator 2 from the right side thereof, and this light is output from the optical circulator 2 to the photodetector 4 arranged therebelow.

The multi-function integrated optical circuit 3 includes a polarizer 3a, a Y-branch/recombiner 3b, a first phase modulator 3c, and a second phase modulator 3d. For example, a MIOC (Multi-function Integrated Optics Chip) is able to be used as the multi-function integrated optical circuit 3. The polarizer 3a receives light from the light source 1 through the optical circulator 2. The polarizer 3a allows a single polarized light to pass therethrough. The Y-branch/recombiner 3b branches the light from the polarizer 3a, i.e., the single polarized light and makes the resultant lights enter both ends of the fiber-optic coil 6. The lights entering both ends of the fiber-optic coil 6 become respectively the counterclockwise light and the clockwise light. Then the Y-branch/recombiner 3b recombines the counterclockwise light and the clockwise light that have passed through the fiber-optic coil 6 and outputs the resultant light to the optical circulator 2 as interference light. The first phase modulator 3c modulates one of the lights to enter one end of the fiber-optic coil 6 (e.g., light to become the clockwise light). The second phase modulator 3d modulates the other one of the lights to enter the other end of the fiber-optic coil 6 (e.g., light to become the counterclockwise light).

The phase modulation signal generating device 10 for a fiber-optic gyroscope according to the present invention generates a phase modulation signal to the multi-function integrated optical circuit 3. Specifically, the phase modulation signal generating device 10 for a fiber-optic gyroscope according to the present invention outputs a phase modulation signal to the first and second phase modulators 3c and 3d of the multi-function integrated optical circuit 3. The phase modulation signal generating device 10 for a fiber-optic gyroscope according to the present invention includes a sine wave generating part 11 and a superimposing part 12. The sine wave generating part 11 generates a fundamental sine wave of an odd-order frequency ($v=(2n+1)v_e$, where $n=0, 1, 2, \ldots$) of the eigenfrequency ($v_e$) of the fiber-optic coil 6 and a higher-order sine wave of an odd-order harmonic frequency (($2m+1)v$, where $m=1, 2, 3, \ldots$) of the odd-order frequency ($v$). The superimposing part 12 superimposes the fundamental sine wave and higher-order sine wave generated by the sine wave generating part 11 at a ratio using a modulation index optimized according to a noise target to be minimized and outputs the resultant signal as a phase modulation signal. The details of the phase modulation signal generating device 10 for a fiber-optic gyroscope according to the present invention will be described later.

The photodetector 4 receives, from the optical circulator 2, the interference light between the counterclockwise light and the clockwise light that have passed through the fiber-optic coil 6 and detects an optical intensity signal of the received interference light.

The synchronous detector 5 performs demodulation using the phase modulation signal (fundamental sine wave of odd-order frequency v) as a reference signal from the phase modulation signal generating device 10 for a fiber-optic gyroscope according to the present invention. When using the phase modulation signal generating device 10 for a fiber-optic gyroscope according to the present invention, the fundamental sine wave of odd-order frequency v generated by the sine wave generating part 11 may be input to the synchronous detector 5 for use as a reference signal for demodulation. Alternatively, a superimposed signal output from the superimposing part 12 may be used as a reference signal for demodulation. The phase detector 5 outputs a detection signal of a rotational angular velocity given to the fiber-optic coil 6 by synchronously detecting the light intensity signal detected by the photodetector 4.

With the configuration described above, the interference type fiber-optic gyroscope can detect the rotational angular velocity applied to the fiber-optic coil 6.

The phase modulation signal generating device 10 for a fiber-optic gyroscope according to the present invention is configured to superimpose a fundamental sine wave of frequency v and a higher-order sine wave of frequency (2m+1) v at a ratio using a modulation index optimized according to a noise target to be minimized, as described below. Note that the optimized ratio is different from the ratio obtained when a square wave is Fourier transformed.

As described above, the phase modulation signal generating device 10 for a fiber-optic gyroscope according to the present invention includes the sine wave generating part 11 and the superimposing part 12.

The sine wave generating part 11 generates a fundamental sine wave of an odd-order frequency (v=(2n+1)$v_e$, where n=0, 1, 2, . . . ) of the eigenfrequency ($v_e$) of the fiber-optic coil and a higher-order sine wave of an odd-order harmonic frequency ((2m+1) v, where m=1, 2, 3, . . . ) of the odd-order frequency (v). That is, the sine wave generating part 11 generates two sine waves of, for example, a fundamental sine wave of 3 $v_e$ and a higher-order sine wave of 5×(3 $v_e$).

The superimposing part 12 superimposes the fundamental sine wave and the higher-order sine wave generated by the sine wave generating part 11 at a ratio using a modulation index optimized according to a noise target to be minimized and outputs the resultant signal as a phase modulation signal. The following describes a method of calculating the modulation index optimized according to a noise target to be minimized.

First, description will be given of ARW (Angular Random Walk: short-term noise) in the case where phase modulation/demodulation is performed using the frequency (v) of the fundamental sine wave, that is, the order of sine wave addition is 1. A photocurrent, which is the light intensity signal obtained by the photodetector 4 when no phase modulation signal is applied to the multi-function integrated optical circuit 3, is defined as $I_0$. Further, the angular frequency of the phase modulation brought about by the multi-function integrated optical circuit 3 is defined as (o, the modulation index as cp, and the Sagnac phase brought about by the rotational angular velocity applied to the fiber-optic coil 6 as θ. In this case, a photocurrent I(t) when modulation is applied to the multi-function integrated optical circuit 3 is expressed as follows:

$$I(t) = \frac{I_0}{2}\{1 + \cos[\theta + \phi\sin\omega t]\} \qquad \text{Numeral 1}$$

Therefore, signal strength $S_\omega$ when demodulated at an angular frequency ω is expressed as follows:

$$S_\omega = \frac{2}{T}\int_0^T I(t)\sin\omega t\,dt = -I_0 J_1(\phi)\sin\theta \qquad \text{Numeral 2}$$

where, T=2π/ω, and $J_1$ is the first order Bessel function. Further, assuming that the scale factor of the interference type fiber-optic gyroscope is SF and that the rotational angular velocity applied to the fiber-optic coil 6 is Ω, Sagnac phase θ is sufficiently smaller than 1, then Numeral 2 can be expressed as follows:

$$S_\omega \approx -I_0 J_1(\phi)SF\Omega \qquad \text{Numeral 3}$$

From the above, when the noise intensity is $S_{noise}$, and a detection bandwidth is B, ARW is expressed as follows:

$$ARW = \frac{S_{noise}}{SF J_1(\phi)I_0\sqrt{B}} \qquad \text{Numeral 4}$$

When the noise intensity $S_{noise}$ is obtained for each type of noise, it is possible to calculate ARW by using Numeral 4.

The following describes relative intensity noise (RIN) and shot noise, which are noise targets to be minimized. Assuming that the spectral width of the light source 1 is Δv, the detection bandwidth is B, and the white noise with a deviation of 1 is $\delta_{white}$, when the Sagnac phase is sufficiently small, the photocurrent $I_{RIN}(t)$ of RIN is expressed as follows:

$$I_{RIN}(t) = \frac{I_0\sqrt{B}}{2\sqrt{\Delta v}}\delta_{white}\{1 + \cos[\phi\sin\omega t]\} \qquad \text{Numeral 5}$$

Therefore, the signal strength $S_{RIN}$ of RIN when demodulated at an angular frequency ω is expressed as follows:

$$S_{RIN} = \frac{2}{T}\int_0^T I_{RIN}(t)\sin\omega t\,dt \qquad \text{Numeral 6}$$

On the other hand, assuming that an elementary charge is e and the Sagnac phase is sufficiently smaller than 1, the shot noise photocurrent $I_{SHOT}(t)$ is expressed as follows:

$$I_{SHOT}(t) = \delta_{white}\sqrt{eI_0 B}\sqrt{1 + \cos[\phi\sin\omega t]} \qquad \text{Numeral 7}$$

Therefore, the signal intensity $S_{SHOT}$ of the shot noise when demodulated at the angular frequency ω is expressed as follows:

$$S_{SHOT} = \frac{2}{T}\int_0^T I_{SHOT}(t)\sin\omega t\,dt \qquad \text{Numeral 8}$$

Based on the above, description will be given of optimization of the ratio at which multiple harmonics are superimposed according to a noise target to be minimized. As an example, description will be given of a case where the order to be superimposed is 2, that is, where the sine wave generating part 11 generates two sine waves of a fundamental sine wave frequency (v) and a higher-order sine wave frequency (e.g., 3 v), and the superimposing part 12 superimposes them at a ratio using a modulation index optimized according to a noise target to be minimized. The photocurrent I(t) at this time is expressed as follows:

$$I(t) = \frac{I_0}{2}\cos[\theta + \phi_1\sin\omega t + \phi_3\sin 3\omega t] \qquad \text{Numeral 9}$$

7

Therefore, the signal strength $S_\omega$ when demodulated at the angular frequency $\omega$ is expressed as follows:

$$S_\omega = \frac{2}{T} \int_0^T I(t)\sin\omega t\, dt \cong I_0 f(\phi_1, \phi_3) SF\Omega \qquad \text{Numeral 10}$$

where, f is a function of $\varphi_1$ and $\varphi_3$.

From the above, assuming that the noise intensity is $S_{noise}$ and the detection bandwidth is B, ARW is expressed as follows:

$$ARW = \frac{S_{noise}}{SF f(\phi_1, \phi_3) I_0 \sqrt{B}} \qquad \text{Numeral 11}$$

When the superimposed order is 2, the photocurrent $I_{RIN}(t)$ of RIN is expressed as follows:

$$I_{RIN}(t) = \frac{I_0 \sqrt{B}}{2\sqrt{\Delta v}} \delta_{white}\{1 + \cos[\phi_1 \sin\omega t + \phi_3 \sin 3\omega t]\} \qquad \text{Numeral 12}$$

Therefore, the signal strength $S_{RIN}$ of RIN when demodulated at the angular frequency $\omega$ is expressed as follows:

$$S_{RIN} = \frac{2}{T} \int_0^T I_{RIN}(t)\sin\omega t\, dt \qquad \text{Numeral 13}$$

On the other hand, the photocurrent $I_{SHOT}(t)$ of the shot noise when the superimposed order is 2 is expressed as follows:

$$I_{SHOT}(t) = \delta_{white}\sqrt{eI_0 B}\sqrt{1 + \cos[\phi_1 \sin\omega t + \phi_3 \sin 3\omega t]} \qquad \text{Numeral 14}$$

Therefore, the signal intensity $S_{SHOT}$ of the shot noise when demodulated at the angular frequency $\omega$ is expressed as follows:

$$S_{SHOT} = \frac{2}{T} \int_0^T I_{SHOT}(t)\sin\omega t\, dt \qquad \text{Numeral 15}$$

From the above results, it is possible to calculate ARW when the order to be superimposed is 2 by using RIN or signal intensity of the shot noise ($S_{RIN}$ or $S_{SHOT}$) as the noise intensity of a noise target to be minimized ($S_{noise}$). That is, it is sufficient to calculate $\varphi_1$ and $\varphi_3$ that minimize ARW. The $\varphi_1$ and $\varphi_3$ thus calculated become the optimized modulation index. That is, it is possible to minimize ARW by using sine waves superimposed at a ratio using this modulation index as a phase modulation signal.

In actual fiber-optic gyroscope systems, noise is generated by mixing various types of noise, such as thermal phase noise and read noise, in addition to RIN and shot noise. When RIN is dominant, a modulation index optimized for RIN, that is, a modulation index that can minimize RIN, can be used. When shot noise is dominant, a modulation index that can minimize shot noise can be used. And when RIN and shot noise are mixed, a modulation index that appropriately minimizes ARW can be calculated.

More specific modulation indices are shown below. For example, the values of modulation indices $\varphi_1$, $\varphi_3$, and $\varphi_5$ when modulating at frequencies v, 3 v, and 5 v, respectively, and demodulating at frequency v and the value of ARW when sine waves are superimposed at a ratio using these modulation indices to form a phase modulation signal, are shown in the table below. Table 1 shows modulation indices optimized for RIN. Note that ARW when the order is 1 is set to 1.000.

TABLE 1

| Order | $\varphi_1$ | $\varphi_3$ | $\varphi_5$ | ARW | Improvement rate |
|-------|-------------|-------------|-------------|------|------------------|
| v | 2.70 | | | 1.000 | |
| v, 3v | 3.20 | 0.75 | | 0.586 | 41% |
| v, 3v, 5v | 3.43 | 0.99 | 0.41 | 0.426 | 57% |

It should be noted that the specific values of modulation indices $\varphi_1$, $\varphi_3$, and $\varphi_5$ are merely examples, and the present invention is not limited to these values.

The following describes waveforms of the phase modulation signal using FIGS. 2(a) and 2(b). FIGS. 2(a) and 2(b) illustrates waveforms of a phase modulation signal generated by the phase modulation signal generating device for a fiber-optic gyroscope according to the present invention, FIG. 2(a) is the waveform for order 2 and FIG. 2(b) is the waveform for order 3. In the drawings, the black line is the waveform generated by the present invention and is a waveform intended to reduce RIN. The gray line is taken as a comparative example and is a rectangular wave generated by Fourier transform. As can be seen from the drawings, the waveform generated using the ratio optimized by the present invention is different from the rectangular wave generated using the Fourier transform ratio. When such a waveform is used as a phase modulation signal, ARW is minimized.

FIG. 3 is a graph illustrating a change in ARW with respect to the modulation index. In this graph, the solid line indicates a case where the ratio optimized by the present invention is used, and the dashed line indicates a case where the ratio obtained by Fourier transform is used as a comparative example. As illustrated, it can be seen that ARW is smaller at all orders when the ratio optimized by the present invention is used as compared with the case where the ratio obtained by Fourier transform is used. It can also be seen that as the order becomes higher, ARW becomes closer to a value obtained when an ideal rectangular wave is used. However, an ideal rectangular wave cannot be created in reality, so that it is preferable to generate a waveform using the ratio optimized by the present invention.

As can be seen from Table 1 and FIG. 3 above, when the sine wave generating part 11 generates sine waves having frequencies of v and 3 v, and the superimposing part 12 superimposes these sine waves at a ratio using the optimized modulation index, a sufficient effect can be obtained. It can also be seen that an even greater effect can be obtained when sine waves having frequencies of v, 3 v, and 5 v are generated and superimposed at a ratio using the optimized modulation index. Note that more orders may be used, and combinations such as v and 5 v may also be used.

As described above, using the phase modulation signal generating device for a fiber-optic gyroscope according to the present invention makes it possible to generate a phase modulation signal to a multi-function integrated optical circuit suitable for reducing relative intensity noise, shot noise, and the like.

Here, the phase modulation signal generating device 10 for a fiber-optic gyroscope according to the present invention can be realized, for example, as an arbitrary waveform generator. That is, the sine wave generating part 11 and the superimposing part 12 can be constituted, for example, by an FPGA (Field Programmable Gate Array). By using the FPGA, it is possible to generate all at once, as a phase modulation signal, a waveform in which v, 3 v, 5 v, and the like are digitally superimposed at a ratio using a modulation index optimized according to a noise target to be minimized. By generating the necessary waveforms all at once using the FPGA, it is also possible to avoid the problem of a temporal phase drift between v, 3 v, and 5 v. That is, the phase modulation signal generating device for a fiber-optic gyroscope according to the present invention is not limited to one in which the sine wave generating part and the superimposing part are physically separated and may be one in which they are functionally integrated.

The phase modulation signal generating device for a fiber-optic gyroscope according to the present invention is not limited to the above-mentioned illustrated example, and various modifications can be made without departing from the spirit of the present invention.

The invention claimed is:

1. A phase modulation signal generating device for a fiber-optic gyroscope that generates a phase modulation signal to a multi-function integrated optical circuit having a phase modulator that modulates light to enter a fiber-optic coil of an interference type fiber-optic gyroscope, the phase modulation signal generating device for a fiber-optic gyroscope comprising:

a sine wave generator that generates a fundamental sine wave of an odd-order frequency ($v=(2n+1)v_c$, where n=0, 1, 2, . . . ) of the eigenfrequency ($v_c$) of the fiber-optic coil and a higher-order sine wave of an odd-order harmonic frequency ($(2m+1)$ v, where m=1, 2, 3, . . . ) of the odd-order frequency (v); and a superimposer that superimposes the fundamental sine wave and higher-order sine wave generated by the sine wave generator at a ratio using a modulation index optimized according to relative intensity noise or shot noise, or mixing noise thereof to be minimized and outputs the resultant signal to the phase modulator as a phase modulation signal.

2. The phase modulation signal generating device for a fiber-optic gyroscope according to claim 1, wherein the odd-order harmonic frequency of the higher-order sine wave generated by the sine wave generator is 3 v.

3. The phase modulation signal generating device for a fiber-optic gyroscope according to claim 1, wherein the odd-order harmonic frequency of the higher-order sine wave generated by the sine wave generator is 3 v and 5 v.

4. The phase modulation signal generating device for a fiber-optic gyroscope according to claim 1, wherein the fundamental sine wave generated by the sine wave generator is used as a reference signal for demodulation.

5. The phase modulation signal generating device for a fiber-optic gyroscope according to claim 1, wherein a superimposed signal output from the superimposer is used as a reference signal for demodulation.

6. The phase modulation signal generating device for a fiber-optic gyroscope according to claim 1, wherein a noise target to be minimized in the superimposer is relative intensity noise.

7. The phase modulation signal generating device for a fiber-optic gyroscope according to claim 2, wherein a noise target to be minimized in the superimposer is relative intensity noise.

8. The phase modulation signal generating device for a fiber-optic gyroscope according to claim 3, wherein a noise target to be minimized in the superimposer is relative intensity noise.

9. The phase modulation signal generating device for a fiber-optic gyroscope according to claim 4, wherein a noise target to be minimized in the superimposer is relative intensity noise.

10. The phase modulation signal generating device for a fiber-optic gyroscope according to claim 5, wherein a noise target to be minimized in the superimposer is relative intensity noise.

* * * * *